(12) United States Patent
Brisebois et al.

(10) Patent No.: US 8,437,748 B2
(45) Date of Patent: May 7, 2013

(54) METHOD FOR MANAGING MULTIPLE RADIO ACCESS BEARERS IN A SINGLE HANDSET

(75) Inventors: Arthur Brisebois, Cumming, GA (US); William Neil Feidt, Atlanta, GA (US); John T. Stupka, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 169 days.

(21) Appl. No.: 12/831,836

(22) Filed: Jul. 7, 2010

(65) Prior Publication Data

US 2012/0009930 A1    Jan. 12, 2012

(51) Int. Cl.
*H04M 3/00*    (2006.01)
(52) U.S. Cl.
USPC ......... 455/418; 455/574; 455/550.1; 370/328

(58) Field of Classification Search .................. 455/418, 455/574, 550.1; 370/328; 713/1
See application file for complete search history.

(56) References Cited

U.S. PATENT DOCUMENTS

| | | | |
|---|---|---|---|
| 8,159,551 B2 * | 4/2012 | Katz | 348/222.1 |
| 2007/0061557 A1 * | 3/2007 | Shauh et al. | 713/1 |
| 2007/0091836 A1 * | 4/2007 | Oprescu-Surcobe et al. | 370/318 |
| 2007/0173283 A1 * | 7/2007 | Livet et al. | 455/552.1 |
| 2010/0067434 A1 * | 3/2010 | Siu et al. | 370/328 |

* cited by examiner

*Primary Examiner* — Danh Le
(74) *Attorney, Agent, or Firm* — Woodcock Washburn LLP

(57) ABSTRACT

A method for managing a voice call while simultaneously running a data application on a handset having a display includes determining whether the display on the handset is on or off; and if the display is off, then suspending data transfer supporting the data application. Other conditions for suspending data transfer include whether an application is in the foreground of the display; whether the handset is in proximity to a user's head, or if network reception quality exceeds a threshold.

17 Claims, 6 Drawing Sheets

METHOD FOR MANAGING MULTIPLE RADIO ACCESS BEARERS IN A SINGLE HANDSET

TECHNICAL FIELD

This technical field is directed to the management of multiple radio access bearers in a single handset.

BACKGROUND

With many new smartphones operating on faster and more robust networks, users are able to access data applications while simultaneously being on a voice call. The voice channel (also known as a voice bearer) may be operating at the same time that multiple applications may be accessing a data bearer on a single device. This is known as multiple radio access bearer (mRAB) calls. The operation of mRAB calls is different than voice only (circuit switched) calls.

One of the key differences between a circuit switched call and a mRAB call are the spreading factors used across the various radio access bearer configurations. The higher rate packet switched radio access bearer typically utilizes lower spreading factors, and therefore lower processing gains. However, this spreading factor is used across the entire physical channel, which includes the logical channels (such as the circuit switched radio access bearer and the signaling radio bearer) that are mapped onto that physical channel. The lower spreading factor correlates to a lower processing gain for the signaling radio bearer.

Moreover, during mRAB calls, there is much more signaling between the UMTS Radio Access Network (UTRAN) and user equipment (UE) across the signaling radio bearer than there may be during a circuit switched call. Frequent radio bearer reconfigurations during mRAB calls may slow updates to the control link between the base station and the UE. If the packet switched bearer is dropped during such updates, there may be an interrupted data flow. If the signaling radio bearer breaks down even momentarily, there may be dropped voice call. The stress on the signaling radio bearer may be exasperated under heavy network loads or rapidly changing signal to noise ratios.

SUMMARY

A voice call is managed while simultaneously running a data application on a handset having a display by determining whether the display on the handset is on or off. If the display is off, data transfer supporting the data application is suspended. Other conditions for suspending data transfer include whether an application is in the foreground of the display; whether the handset is in proximity to a user's head, whether the display is active or in a power saver mode, the signal quality between the handset and a network, or if network reception quality exceeds a threshold.

In an example embodiment, a method for managing a voice call while simultaneously running a data application on a handset, includes detecting a condition on the handsent, and selectively suspending data transfer supporting the data application based on detecting the condition.

In another example embodiment, a tangible storage medium is configured to have stored thereon computer-executable instructions for running a data application on a handset, detecting a condition on the handsent, and selectively suspending data transfer supporting the data application based on detecting the condition.

In yet another example embodiment, a handset is configured to simultaneously run a data application on a handset, detect a condition on the handsent and selectively suspend data transfer supporting the data application based on detecting the condition.

BRIEF DESCRIPTION OF THE DRAWINGS

The following description is better understood when read in conjunction with the appended drawings.

DETAILED DESCRIPTION OF ILLUSTRATIVE EMBODIMENTS

Figure 1:
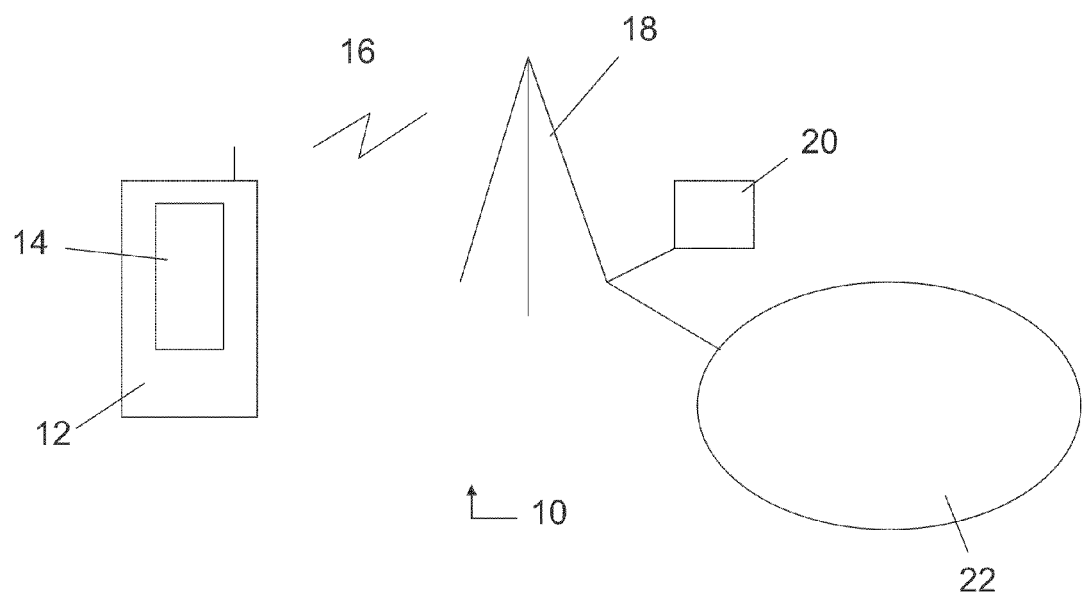
FIG. 1 is a system diagram of an embodiment in which an active voice call and data application may be operating simultaneously.

Exemplary embodiments are herein described with reference to the figures. With reference to FIG. 1, there is shown an exemplary system 10 of the disclosure. There is shown a handset 12 having a display 14 thereon. It will be understood that the present disclosure may use a smartphone as an exemplary embodiment, but the present disclosure shall not be limited to a smartphone, but may be any type of user equipment that is capable of communicating with a network and may or may not include a display. The handset 12 (also referred to as user equipment or UE herein) communicates wireless over air link 16 to cellular tower 18. The cellular tower 18 is controlled by a base station controller 20 that controls communication between the cellular tower 18 and network 22. It will be understood that network may be any type of network, including but not limited to GSM, CDMA, EDGE, 3G, 4G, LTE or any other wireless network and may also interface and provide access to wired networks, including the internet. Those skilled in the art will understand that the configuration of FIG. 1 is a simplified example only and that the disclosure may operate on a network that has a complete set of network elements and interfaces, such as that described in connection with FIG. 4 through FIG. 6.

Figure 2:
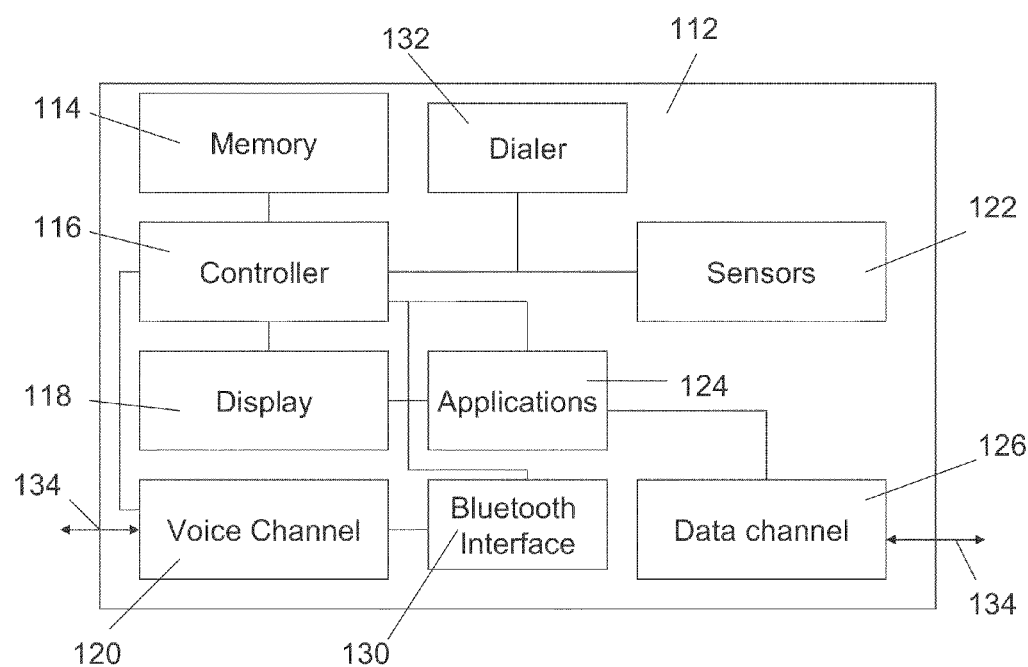
FIG. 2 is a block diagram illustrating the functionality of an exemplary embodiment of a user equipment.

With reference to FIG. 2, there is shown an exemplary functional block diagram of user equipment 112. User equipment 112 has a controller 116 and a memory 114. As will be appreciated by those skilled in the art, the controller 116 may be any type of microprocessor that may be utilized in a smartphone or other user equipment, including but not limited to controllers manufactured by Samsung, Texas Instruments, Qualcomm, Apple and others. As will be further understood by those skilled in the art, the memory 114 may be any type of physical memory that stores program information and data, including but not limited to RAM, EEPROM, flash memory, disc drives, or any other type of memory. The memory 114 may store the client software that the controller 116 uses to execute the processes described herein. Also shown is a dialer 132 which may be used to initiate voice calls or data transfers using SMS, IM, or other types of data communications.

The controller 116 controls all of the functional processes described in FIG. 2. However, those skilled in the art will recognize that there may be additional functions of user equipment 112 beyond those shown in the simplified exemplary embodiment diagram. The lines interconnecting the various functions are exemplary only and are not meant to limit the interconnectivity or interaction of user equipment 112 functions in any manner. As understood by those skilled in the art, the controller 116 communicates with the network using a signaling bearer (not shown) to determine call quality, signal to noise ratios, call hand-over, network loading, and other control functions that are used operationally by the user equipment 112 and the network for wireless communications.

The user equipment 112 may have a display 118. The display 118 may be any type of display known by those skill in the art utilized in user equipment 112, including but not limited to touch screen and non-touch screen displays. The display 118 may have screen saver or power saver operational modes. In the context of the present disclosure, the screen saver and/or power saver modes are equivalent and mean that after a certain period of inactivity on the part of a user, the brightness of the screen may be decreased, the screen may be turned off, the display may be altered to display a logo or other screen saver message that uses less power, or any other type of modification that transitions the display to a screen saver or power saver mode. The user may be able to control the on-off state of the display through control buttons or soft keys (not shown) or by simply tapping the display screen.

The user equipment 112 may have sensors 122. The sensors 122 may include accelerometers which detect the movement and orientation of the user equipment 112. The sensors 122 may include position sensors which detect the position of the user equipment 114 relative to the user. For example, the sensors 122 may detect when the user equipment 112 is positioned near the head of the user indicating that the user may be utilizing the voice channel 120 using the internal speaker (not shown) of the user equipment 112 placed near the user's ear. The sensors 122 may detect that the speaker phone (not shown) functionality of the user equipment 112 is being used wherein the user equipment is not placed near the user's ear. Alternatively, the sensors 122 may detect that the Bluetooth interface 130 of the user equipment 112 is being used which may disable the internal speaker (not shown) of the user equipment 112. It will be understood by those skilled in the art that other conditions may be detected by the sensors 122, some of which may be used in the present disclosure.

The user equipment 112 typically includes both a voice channel 120 and a data channel 126. In accordance with the present disclosure, the voice channel 120 and the data channel 126 may be utilized simultaneously by the user equipment 112. The voice channel 120 and the data channel 126 may be mapped to the same physical channel (134) for wireless communication. It will be understood by those skilled in the art that the voice channel 120 and the data channel 126 may be controlled operationally by controller 116. The voice channel 120 may typically be a circuit switched channel while the data channel 126 may typically be a packet switched channel. A user's voice conversation may use the voice channel 120 while applications 124 running on the user equipment 112 may use the data channel 126 for communication with the network. Example applications may include navigation, streaming music or video, games, or any type of the multitude of applications now known or to be created. The data channel 126 may use time division multiplexing for multiple applications running simultaneously.

The controller 116 may have the ability to suspend the transfer of data across the data channel 126 upon the detection of certain conditions. For example, if there is a simultaneous use of the voice channel 120 and the data channel 126, the controller 116 may choose to favor the voice channel 120 in order to avoid a poor quality or dropped voice call. There are certain conditions which, if detected by sensors 122, will assist the controller 116 in making decisions as to whether to favor the voice call. For example, if the sensors 122 detect that the user equipment 112 is up against the user's head, the controller 116 may make the assumption that the user is not actively involved in the data application that may be running in the background. In such a situation, the controller 116 may suspend data communications across the data channel 126 until the position of the user equipment 112 is changed. Other conditions which may be detected by the sensors 122 which may indicate to the controller 116 that data communications may be suspended include, but are not limited to, the display being turned off (meaning that the display has entered either a screen saver or power saver mode or been turned off by a user), the video associated with data applications is not in the foreground of the display. In addition, because the user equipment 112 may normally be monitoring the reception quality, the controller 116 may be programmed to suspend data communications when the detected reception quality of the network exceeds a certain threshold. Finally, the user may opt to suspend or not to suspend data communications during a voice call. In each case in which the data communications have been suspended, data communications may be re-started when any of the detected conditions are no longer present or upon command by the user. The controller 116 may also permit certain alerts, including but not limited to emergency alerts, to use the data channel 126 regardless of the state of the data communication suspension.

Figure 3:
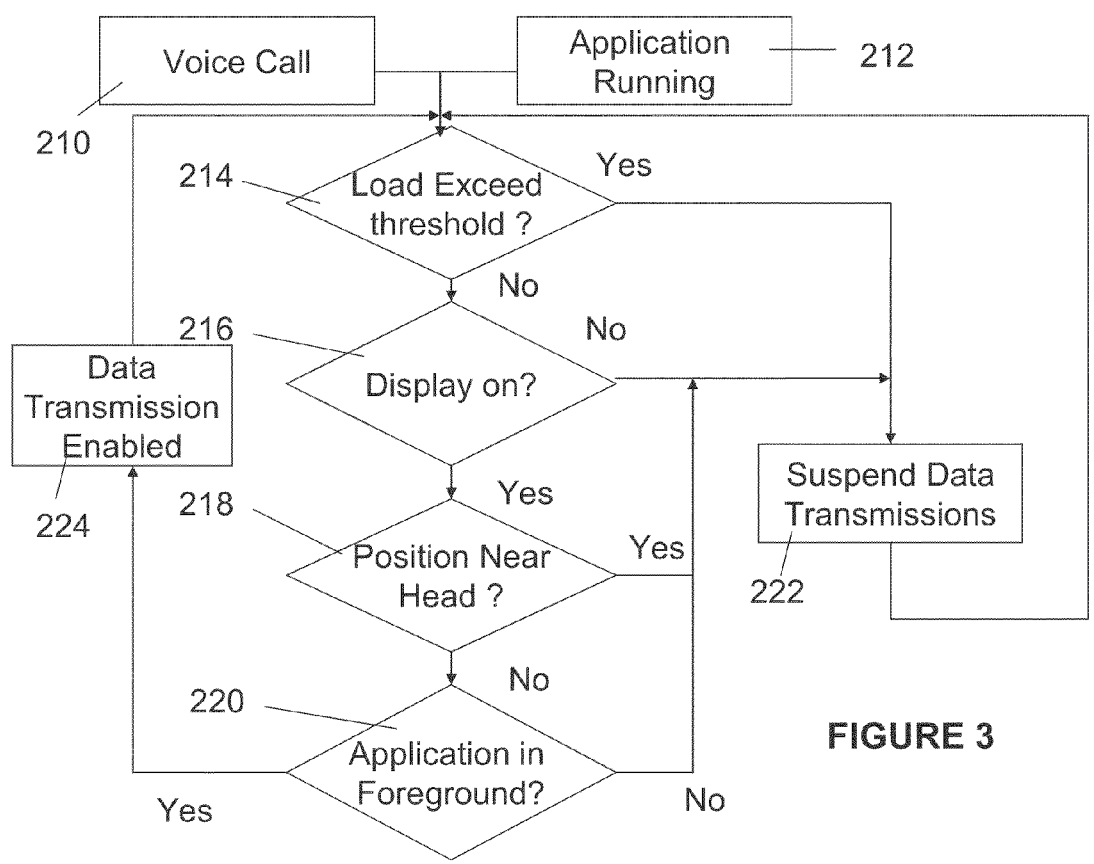
FIG. 3 is an exemplary flow chart illustrating an exemplary method in accordance with the disclosure.

In operation and with reference to FIG. 3, there is shown an exemplary flow chart indicating steps which may be performed in the present disclosure. The conditions for the present disclosure include an active voice call 210 and an active data application 212. At step 214, the network conditions are compared to a threshold. If the network reception quality exceeds the threshold, then data communications are suspended at step 222. If not, at step 216, the display is detected to determine its state. If the display is off or otherwise in power saver or screen saver mode, then the data communications are suspended at step 222. If not, at step 218, the position of the user equipment 112 is detected. If the user equipment is in proximity to the head, then the data communications are suspended at step 222. If not, at step 220, the decision is made as to whether a data application is in the foreground of the display is made. If not, then data communications are suspended at step 222. If none of the foregoing data suspense conditions are met, then the data communications is enabled at step 224. In any case, the process repeats itself at step 214 continuously or periodically while the voice call and the applications are running concurrently so as to monitor the conditions and adjust the data communications suspension or enablement accordingly. Additionally, those skilled in the art should understand that the conditions to be detected may be performed in any order and may be performed individually or as part of a complete set. It should also be understood that as an alternative, any one condition such as network reception quality, may be used to override any other detected conditions. Finally, as an alternative, the user may choose to override any of the detected conditions, including the ability to always enable or always suspend data communications during a voice call or the ability to always enable or suspend data communications on an application by application basis based on the application itself or the anticipated bandwidth required for the application.

The functionality of the disclosure may be included in client software residing on the user equipment 112. In such a case, logic for performing the functions set forth above may be included and stored in a computer readable medium such as memory 114. The computer readable medium may include a memory having a physical structure and be integrated within the user equipment 112 or be implemented on a removable memory such as a memory card, memory stick, flash drive or other type of external memory. Additionally, the client software may be stored on a network and downloaded into RAM of the user equipment for use during mRAB calls.

Figure 4:
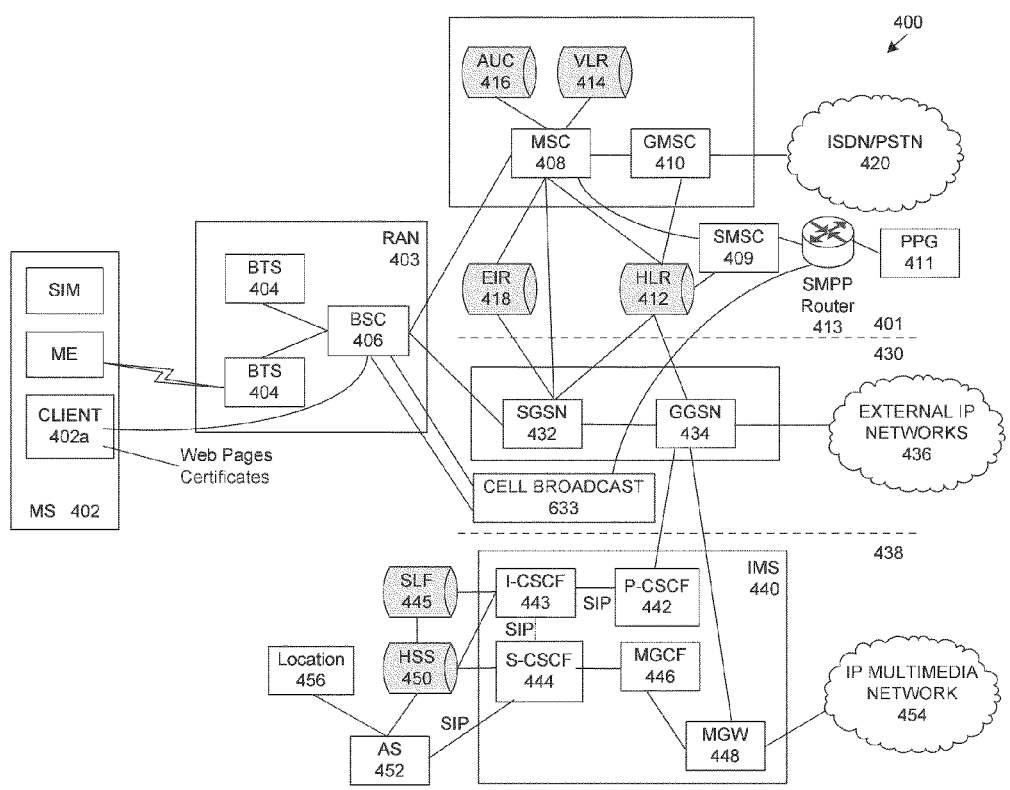
FIG. 4 illustrates an exemplary block diagram view of a GSM/GPRS/IP multimedia network architecture within which multiple radio access bearers can be managed in a single handset.

FIG. 4 is directed to the general operating environment of a host device and universal radio module provided herein. Terms such as "cellular communications" should be generally understood by those of skill in the art, and should be distinguished from other forms of wireless communications such as those based on the 802.11 protocols. FIG. 4 generally illustrates a cellular communications operating environment. The invention and the term cellular communications are not limited to any specific aspects of FIG. 4, but should rather be understood to operate in and refer to (respectively) operating environments such as the general type of operating environment illustrated in FIG. 4.

The global system for mobile communication ("GSM") is one of the most widely utilized cellular communications systems in today's fast growing telecommunication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High-Speed Downlink Packet Access ("HSDPA"), High-Speed Uplink Packet Access ("HSUPA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

FIG. 4 shows another exemplary block diagram view of a GSM/GPRS/IP multimedia network architecture 400 in which the apparatus and methods for service delivery based on priority level and/or revenue impact of the present invention may be incorporated. As illustrated, architecture 400 of FIG. 4 includes a GSM core network 401, a GPRS network 430 and an IP multimedia network 438. The GSM core network 401 includes a Mobile Station (MS) 402, at least one Base Transceiver Station (BTS) 404 and a Base Station Controller (BSC) 406. The MS 402 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 404 is physical equipment, such as a radio tower, that enables a radio interface to communicate with the MS. Each BTS may serve more than one MS. The BSC 406 manages radio resources, including the BTS. The BSC may be connected to several BTSs. The BSC and BTS components, in combination, are generally referred to as a base station (BSS) or radio access network (RAN) 403.

The GSM core network 401 also includes a Mobile Switching Center (MSC) 408, a Gateway Mobile Switching Center (GMSC) 410, a Home Location Register (HLR) 412, Visitor Location Register (VLR) 414, an Authentication Center (AuC) 418, and an Equipment Identity Register (EIR) 416. The MSC 408 performs a switching function for the network. The MSC also performs other functions, such as registration, authentication, location updating, handovers, and call routing. The GMSC 410 provides a gateway between the GSM network and other networks, such as an Integrated Services Digital Network (ISDN) or Public Switched Telephone Networks (PSTNs) 420. In other words, the GMSC 410 provides interconnecting functionality with external networks.

The HLR 412 is a database that contains administrative information regarding each subscriber registered in a corresponding GSM network. The HLR 412 also contains the current location of each MS. The VLR 414 is a database that contains selected administrative information from the HLR 412. The VLR contains information necessary for call control and provision of subscribed services for each MS currently located in a geographical area controlled by the VLR. The HLR 412 and the VLR 414, together with the MSC 408, provide the call routing and roaming capabilities of GSM. The AuC 416 provides the parameters needed for authentication and encryption functions. Such parameters allow verification of a subscriber's identity. The EIR 418 stores security-sensitive information about the mobile equipment.

A Short Message Service Center (SMSC) 409 allows one-to-one Short Message Service (SMS) messages to be sent to/from the MS 402. A Push Proxy Gateway (PPG) 411 is used to "push" (i.e., send without a synchronous request) content to the MS 402. The PPG 411 acts as a proxy between wired and wireless networks to facilitate pushing of data to the MS 402. A Short Message Peer to Peer (SMPP) protocol router 413 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 402 sends a location update including its current location information to the MSC/VLR, via the BTS 404 and the BSC 406. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 430 is logically implemented on the GSM core network architecture by introducing two packet-switching network nodes, a serving GPRS support node (SGSN) 432, a cell broadcast and a Gateway GPRS support node (GGSN) 434. The SGSN 432 is at the same hierarchical level as the MSC 408 in the GSM network. The SGSN controls the connection between the GPRS network and the MS 402. The SGSN also keeps track of individual MS's locations and security functions and access controls.

A Cell Broadcast Center (CBC) 433 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 434 provides a gateway between the GPRS network and a public packet network (PDN) or other IP networks 436. That is, the GGSN provides interconnecting functionality with external networks, and sets up a logical link to the MS through the SGSN. When packet-switched data leaves the GPRS network, it is transferred to an external TCP-IP network 436, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 430 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 438 was introduced with 3GPP Release 5, and includes an IP multimedia subsystem (IMS) 440 to provide rich multimedia services to end users. A representative set of the network entities within the IMS 440 are a call/session control function (CSCF), a media gateway control function (MGCF) 446, a media gateway (MGW) 448, and a master subscriber database, called a home subscriber server (HSS) 450. The HSS 450 may be common to the GSM network 401, the GPRS network 430 as well as the IP multimedia network 438.

The IP multimedia system 440 is built around the call/session control function, of which there are three types: an interrogating CSCF (I-CSCF) 443, a proxy CSCF (P-CSCF) 442, and a serving CSCF (S-CSCF) 444. The P-CSCF 442 is the MS's first point of contact with the IMS 440. The P-CSCF 442 forwards session initiation protocol (SIP) messages received from the MS to an SIP server in a home network (and vice versa) of the MS. The P-CSCF 442 may also modify an outgoing request according to a set of rules defined by the network operator (for example, address analysis and potential modification).

The I-CSCF 443 forms an entrance to a home network and hides the inner topology of the home network from other networks and provides flexibility for selecting an S-CSCF. The I-CSCF 443 may contact a subscriber location function (SLF) 445 to determine which HSS 450 to use for the particular subscriber, if multiple HSS's 450 are present. The S-CSCF 444 performs the session control services for the MS 402. This includes routing originating sessions to external networks and routing terminating sessions to visited networks. The S-CSCF 444 also decides whether an application server (AS) 452 is required to receive information on an incoming SIP session request to ensure appropriate service handling. This decision is based on information received from the HSS 450 (or other sources, such as an application server 452). The AS 452 also communicates to a location server 456 (e.g., a Gateway Mobile Location Center (GMLC)) that provides a position (e.g., latitude/longitude coordinates) of the MS 402.

The HSS 450 contains a subscriber profile and keeps track of which core network node is currently handling the subscriber. It also supports subscriber authentication and authorization functions (AAA). In networks with more than one HSS 450, a subscriber location function provides information on the HSS 450 that contains the profile of a given subscriber.

The MGCF 446 provides interworking functionality between SIP session control signaling from the IMS 440 and ISUP/BICC call control signaling from the external GSTN networks (not shown). It also controls the media gateway (MGW) 448 that provides user-plane interworking functionality (e.g., converting between AMR- and PCM-coded voice). The MGW 448 also communicates with other IP multimedia networks 454.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 5:
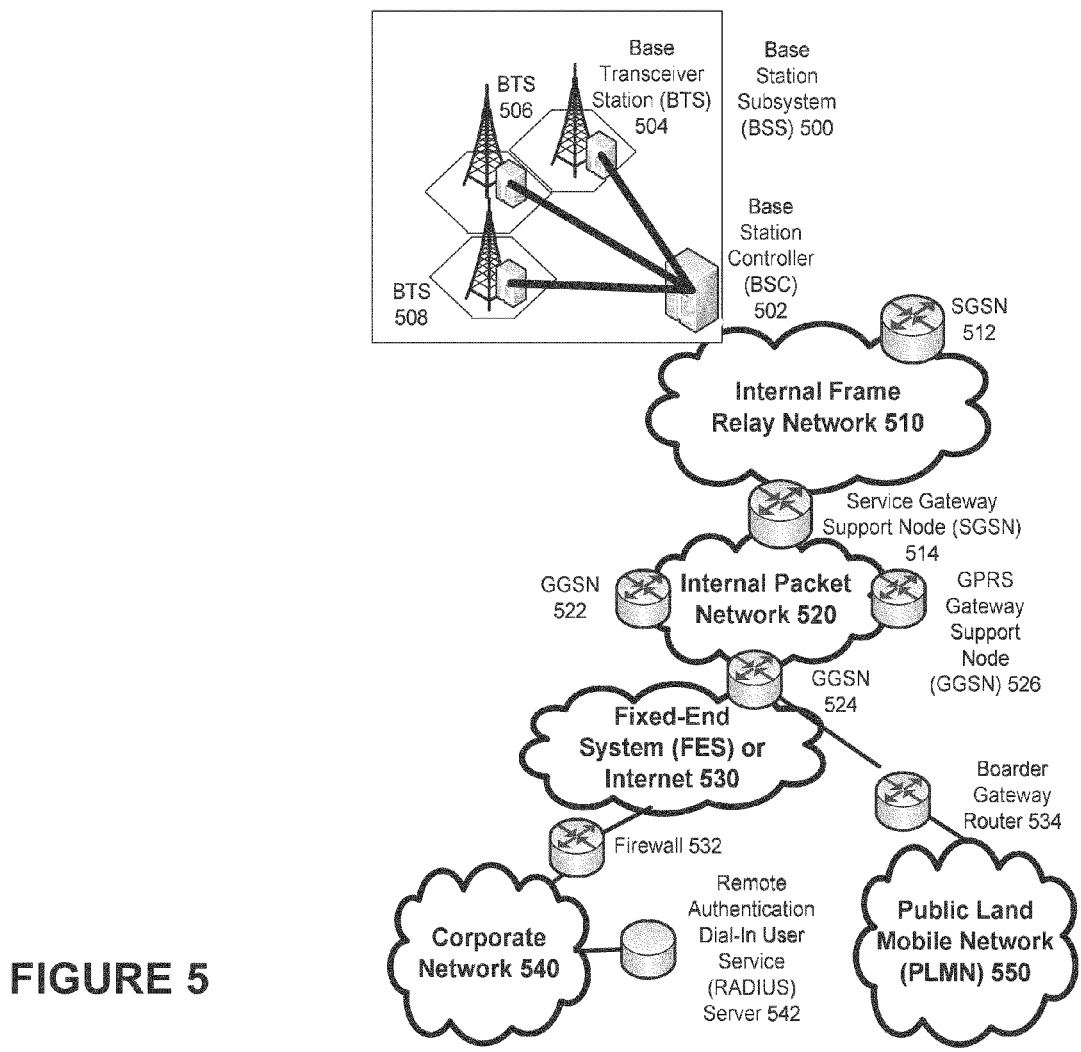
FIG. 5 depicts an overall block diagram of an exemplary packet-based mobile cellular network environment, such as a GPRS network, within which multiple radio access bearers can be managed in a single handset.

FIG. 5 depicts an overall block diagram of an exemplary packet-based mobile cellular network environment, such as a GPRS network, within which geogaming can be implemented. In the exemplary packet-based mobile cellular network environment shown in FIG. 5, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices become connected to the wireless network. In exemplary fashion, the packet traffic originating from user devices is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 may be connected to GGSN 524 via firewall 532; and PLMN 550 is connected to GGSN 524 via boarder gateway router 534. The Remote Authentication Dial-In User Service ("RADIUS") server 542 may be used for caller authentication when a user of a mobile cellular device calls corporate network 540.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
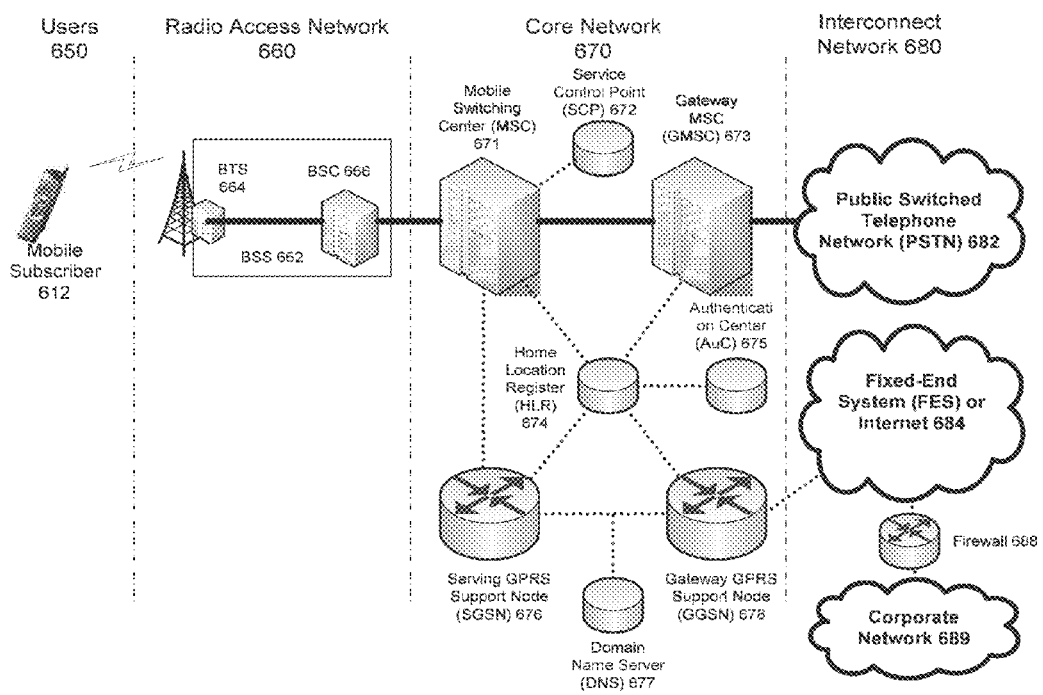
FIG. 6 illustrates an architecture of a typical GPRS network within which multiple radio access bearers can be managed in a single handset.

FIG. 6 illustrates an architecture of a typical GPRS network within which geogaming can be implemented. The architecture depicted in FIG. 6 is segmented into four groups: users 650, radio access network 660, core network 670, and interconnect network 680. Users 650 comprise a plurality of end users. Note, device 612 is referred to as a mobile subscriber in the description of network shown in FIG. 6. In an example embodiment, the device depicted as mobile subscriber 612 comprises a communications device (e.g., communications device 60). Radio access network 660 comprises a plurality of base station subsystems such as BSSs 662, which include BTSs 664 and BSCs 666. Core network 670 comprises a host of various network elements. As illustrated in FIG. 6, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 6, interconnect network 680 comprises Public Switched Telephone Network ("PSTN") 682, Fixed-End System ("FES") or Internet 684, firewall 688, and Corporate Network 689.

A mobile switching center can be connected to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which then sends the data traffic to GGSN 678 for further forwarding.

When MSC 671 receives call traffic, for example, from BSC 666, it sends a query to a database hosted by SCP 672. The SCP 672 processes the request and issues a response to MSC 671 so that it may continue call processing as appropriate.

The HLR 674 is a centralized database for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC 675. AuC 675 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 612 initiates the attach process by turning on the network capabilities of the mobile device, an attach request is sent by mobile subscriber 612 to SGSN 676. The SGSN 676 queries another SGSN, to which mobile subscriber 612 was attached before, for the identity of mobile subscriber 612. Upon receiving the identity of mobile subscriber 612 from the other SGSN, SGSN 676 requests more information from mobile subscriber 612. This information is used to authenticate mobile subscriber 612 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 612 was attached before, to cancel the location process for mobile subscriber 612. HLR 674 then notifies SGSN 676 that the location update has been performed. At this time, SGSN 676 sends an Attach Accept message to mobile subscriber 612, which in turn sends an Attach Complete message to SGSN 676.

After attaching itself with the network, mobile subscriber 612 then goes through the authentication process. In the authentication process, SGSN 676 sends the authentication information to HLR 674, which sends information back to SGSN 676 based on the user profile that was part of the user's initial setup. The SGSN 676 then sends a request for authentication and ciphering to mobile subscriber 612. The mobile subscriber 612 uses an algorithm to send the user identification (ID) and password to SGSN 676. The SGSN 676 uses the same algorithm and compares the result. If a match occurs, SGSN 676 authenticates mobile subscriber 612.

Next, the mobile subscriber 612 establishes a user session with the destination network, corporate network 689, by going through a Packet Data Protocol ("PDP") activation process. Briefly, in the process, mobile subscriber 612 requests access to the Access Point Name ("APN"), for example, UPS.com, and SGSN 676 receives the activation request from mobile subscriber 612. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 612.

Once activated, data packets of the call made by mobile subscriber 612 can then go through radio access network 660, core network 670, and interconnect network 680, in a particular fixed-end system or Internet 684 and firewall 688, to reach corporate network 689.

While example embodiments of managing mRAB calls have been described in connection with various computing devices/processors, the underlying concepts can be applied to any computing device, processor, or system capable of managing mRAB calls. The various techniques described herein can be implemented in connection with hardware or software or, where appropriate, with a combination of both. Thus, the methods and apparatuses of managing mRAB calls can be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). When the program code is loaded into and executed by a machine, such as a computer, the machine becomes an apparatus for managing mRAB calls. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for managing mRAB calls also can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for managing mRAB calls. When implemented on a general-purpose processor, the program code combines with the processor to provide a unique apparatus that operates to invoke the functionality of managing mRAB calls.

While the management of mRAB calls has been described in connection with the various embodiments of the various figures, it is to be understood that other similar embodiments can be used or modifications and additions can be made to the described embodiment for performing the same types of functionality in service delivery without deviating therefrom. Therefore, the management of mRAB calls should not be limited to any single embodiment, but rather should be construed in breadth and scope in accordance with the appended claims.

What is claimed:

1. A device comprising:
a processor; and
memory coupled to the processor, the memory comprising executable instructions that when executed by the processor cause the processor to effectuate operations comprising:
concurrently performing a voice call while executing a data application on the device that is coupled to a network;
detecting, by the device, a condition on the device, the condition comprising a signal quality between the device and the network being below a threshold signal quality;
responsive to detecting the condition, maintaining performance of the voice call and suspending data transfer supporting the data application without suspending the data application; and
enabling data transfer when the signal quality exceeds the threshold.

2. The device of claim 1 wherein, upon removable of the condition, data transfer is enabled without restarting the data application.

3. The device of claim 1 wherein:
the device comprises a display;
the condition further comprises whether the display is active or in a power saver mode; and data transfer is suspended if the display is in the power saver mode.

4. The device of claim 3 wherein the data transfer is enabled when the display exits from the power saver mode.

5. The device of claim 1 wherein:
the device comprises a display;
the condition further comprises whether the data application is in a foreground of the display; and
data transfer is suspended if the data application is not in the foreground of the display.

6. The device of claim 5 wherein the data transfer is enabled when the data application is in the foreground.

7. The method of claim 1 wherein the condition is proximity of the handset to a user's head and wherein the suspending step is executed if the proximity is less than a threshold distance.

8. The method of claim 7 wherein the data transfer is enabled when the proximity exceeds the threshold distance.

9. The method of claim 1 further comprising overriding the suspending step.

10. The method of claim 9 wherein there is a plurality of data applications and the suspending step is executed for a subset of the data application.

11. A tangible computer readable storage medium comprising executable instructions that when executed by a processor cause the processor to effectuate operations comprising:
concurrently performing a voice call while executing a data application on the device that is coupled to a network;
detecting, by the device, a condition on the device, the condition comprising a signal quality between the device and the network being below a threshold signal quality;
responsive to detecting the condition, maintaining performance of the voice call and suspending data transfer supporting the data application without suspending the data application; and
enabling data transfer when the signal quality exceeds the threshold.

12. The medium of claim 11, wherein the data transfer is enabled upon removable of the condition.

13. The medium of claim 11, wherein:
the device comprises a display;
the condition comprises whether the display is active or in a power saver mode; and
data transfer is suspended if the display is in the power saver mode.

14. The medium of claim 13 wherein the data transfer is enabled when the display exits from the power saver mode.

15. The medium of claim 11, wherein:
the device comprises a display;
the condition comprises whether the data application is in a foreground of the display; and
data transfer is suspended if the data application is not in the foreground of the display.

16. The medium of claim 15, wherein the data transfer is enabled when the data application is in the foreground.

17. A method comprising:

concurrently performing a voice call while executing a data application on a mobile device that is coupled to a network;

detecting, by the mobile device, a condition on the mobile device, the condition comprising a signal quality between the device and the network being below a threshold signal quality;

responsive to detecting the mobile device-specific condition, maintaining performance of the voice call and suspending data transfer supporting the data application without suspending the data application; and enabling data transfer when the signal quality exceeds the threshold.

* * * * *